(12) United States Patent
Hirata et al.

(10) Patent No.: US 12,455,004 B2
(45) Date of Patent: Oct. 28, 2025

(54) DRIVE UNIT

(71) Applicants: TOYOTA JIDOSHA KABUSHIKI KAISHA, Toyota (JP); AISIN CORPORATION, Aichi (JP)

(72) Inventors: Marina Hirata, Toyota (JP); Akitaka Ichikawa, Nisshin (JP); Hiroshi Kawanishi, Nisshin (JP); Tsukasa Sakamaki, Toyota (JP); Shohei Nagata, Nisshin (JP); Takayoshi Hanai, Kariya (JP); Teppei Yamashita, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 203 days.

(21) Appl. No.: 18/505,585

(22) Filed: Nov. 9, 2023

(65) Prior Publication Data

US 2024/0167559 A1    May 23, 2024

(30) Foreign Application Priority Data

Nov. 22, 2022  (JP) ................................ 2022-186789

(51) Int. Cl.
*F16H 57/04* (2010.01)
*H02K 7/116* (2006.01)

(52) U.S. Cl.
CPC ......... *F16H 57/0424* (2013.01); *H02K 7/116* (2013.01)

(58) Field of Classification Search
CPC ............. F16H 57/0409; F16H 57/0424; F16H 57/0445; F16H 57/0447; F16H 57/0457; F16H 57/0495; H01F 1/0306; H01F 1/055; H01F 1/057; H01F 1/058; H02K 7/116
See application file for complete search history.

(56) References Cited

U.S. PATENT DOCUMENTS

| 11,174,938 B2* | 11/2021 | Ohkawa | ............... F16H 57/0473 |
| 2018/0180164 A1 | 6/2018 | Hagino | |
| 2019/0173359 A1* | 6/2019 | Ishikawa | .................. H02K 1/32 |

FOREIGN PATENT DOCUMENTS

| JP | 2018-105419 A | 7/2018 |
| JP | 2020-070821 A | 5/2020 |

OTHER PUBLICATIONS

U.S. Appl. No. 17/929,098, filed Sep. 1, 2022, Hiroki Takeda, et al.

* cited by examiner

*Primary Examiner* — Naishadh N Desai
(74) *Attorney, Agent, or Firm* — Sughrue Mion, PLLC

(57) ABSTRACT

A drive unit may include a case comprising an electric motor chamber and a gear chamber; an electric motor comprising a rotor housed in the electric motor chamber; a specific gear housed in the gear chamber; lubricant stored in the electric motor chamber and the gear chamber; and a through hole connecting the electric motor chamber and the gear chamber. An opening of the through hole on a gear chamber side may be positioned so as to face a side surface of the specific gear. A region below a center of the specific gear is defined as a lower region, a part of the lower region that is located rearward of a vertical plane passing through a center axis of the specific gear in a rotation direction of the specific gear is defined as a lower rear region, and the opening may be in the lower rear region.

4 Claims, 5 Drawing Sheets

DRIVE UNIT

REFERENCE TO RELATED APPLICATION

This application claims priority from Japanese Patent Application No. 2022-186789 filed on Nov. 22, 2022. The entire content of the priority application is incorporated herein by reference.

BACKGROUND ART

The technology disclosed herein relates to a drive unit.

Japanese Patent Application Publication No. 2020-070821 describes a drive unit including an electric motor and a gear. A case of the drive unit has an electric motor chamber and a gear chamber. The electric motor is housed in the electric motor chamber and the gear is housed in the gear chamber. The gear rotates with rotation of the rotor of the electric motor. Lubricant is stored in the electric motor chamber and the gear chamber. The drive unit further includes a through hole that connects the electric motor chamber and the gear chamber. When the rotor rotates, the lubricant flows from the electric motor chamber to the gear chamber through the through hole. This flow of lubricant reduces the amount of lubricant in the electric motor chamber, thereby reducing drive loss of the electric motor.

DESCRIPTION

A smooth flow of lubricant within a through hole from an electric motor chamber to a gear chamber helps effectively reduce the drive loss of an electric motor. The disclosure herein proposes a technique that allows lubricant to flow smoothly within a through hole from an electric motor chamber to a gear chamber.

A drive unit of item 1 disclosed herein may comprise a case comprising an electric motor chamber and a gear chamber, an electric motor comprising a rotor housed in the electric motor chamber, a specific gear housed in the gear chamber and configured to rotate with rotation of the rotor; lubricant stored in the electric motor chamber and the gear chamber; and a through hole connecting the electric motor chamber and the gear chamber and configured to allow the lubricant to flow from the electric motor chamber to the gear chamber when the rotor rotates. An opening of the through hole on a gear chamber side may be positioned so as to face a side surface of the specific gear. A region below a center of the specific gear is defined as a lower region, a part of the lower region that is located rearward of a vertical plane passing through a center axis of the specific gear in a rotation direction of the specific gear is defined as a lower rear region, and the opening may be in the lower rear region.

In this drive unit, the opening of the through hole on the gear chamber side is positioned so as to face the side surface of the specific gear in the lower rear region. At this position, a diagonally downward flow of the lubricant is caused in the gear chamber is caused when the specified gear rotates. This flow suppresses the lubricant in the gear chamber from flowing back into the through hole. Therefore, in this drive unit, the lubricant can flow smoothly within the through hole from the electric motor chamber to the gear chamber.

EMBODIMENTS

Figure 1:
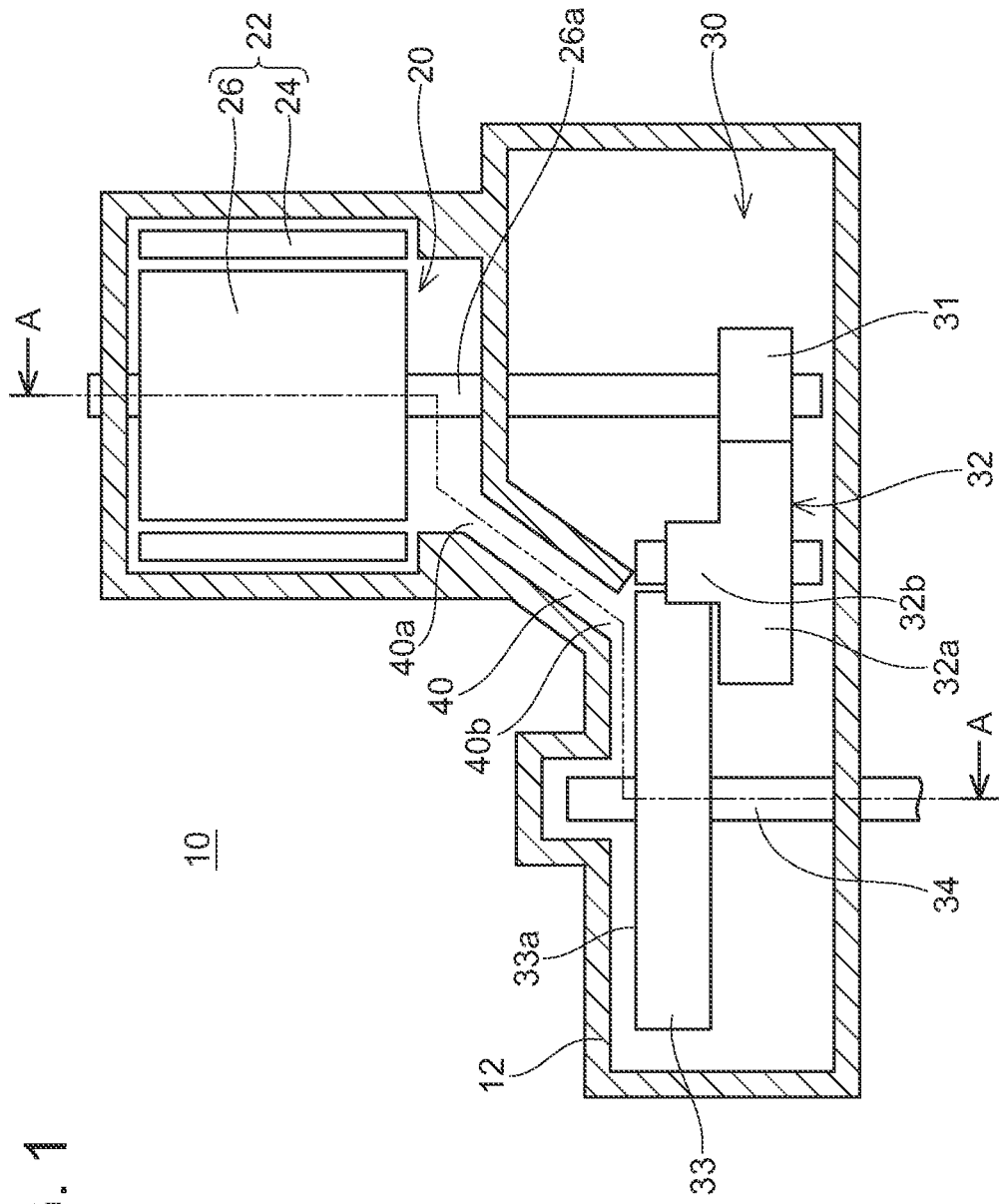
FIG. 1 shows an internal structure of a drive unit as viewed from above.

Following the item 1 above, the configuration of the technology disclosed herein will be described below item by item.

Item 2: The drive unit of item 1, wherein when the rotor rotates, the lubricant discharged from the opening is discharged forward in the rotation direction of the specific gear in the lower rear region.

Item 3: The drive unit of item 1 or 2, wherein a first gear fixed to a shaft of the rotor and a plurality of intermediate gears configured to transmit power from the first gear to the specific gear are housed in the gear chamber, and a number of the intermediate gears is an odd number.

Item 4: The drive unit of any one of items 1 to 3, wherein the through hole is inclined downward from the electric motor chamber toward the gear chamber.

According to the configuration of item 2, the flow of the lubricant discharged from the opening of the through hole into the gear chamber is less turbulent, so that the lubricant flows more smoothly within the through hole from the electric motor chamber to the gear chamber.

According to the configuration of item 3, the shape of the through hole can be simplified, so that the lubricant can flow more smoothly within the through hole from the electric motor chamber to the gear chamber.

According to the configuration of item 4, the lubricant can easily flow within the through hole from the electric motor chamber to the gear chamber.

Figure 2:
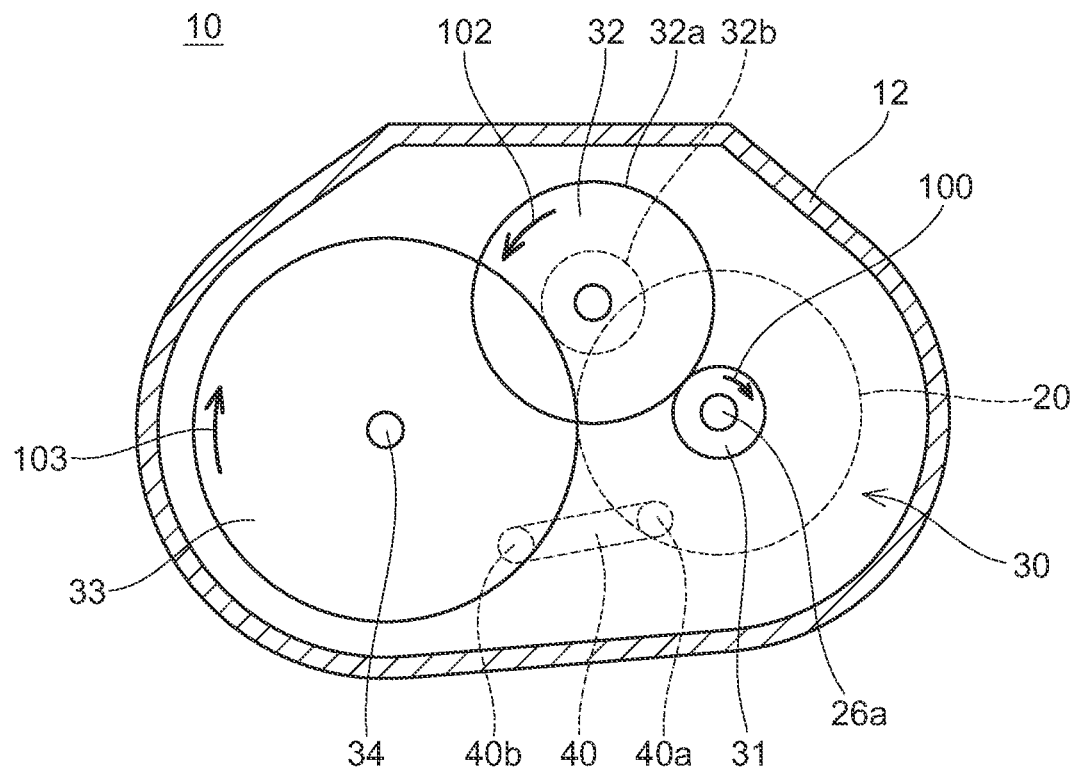
FIG. 2 shows the internal structure of the drive unit as viewed from the side along a rotation axis of a rotor.
Figure 3:
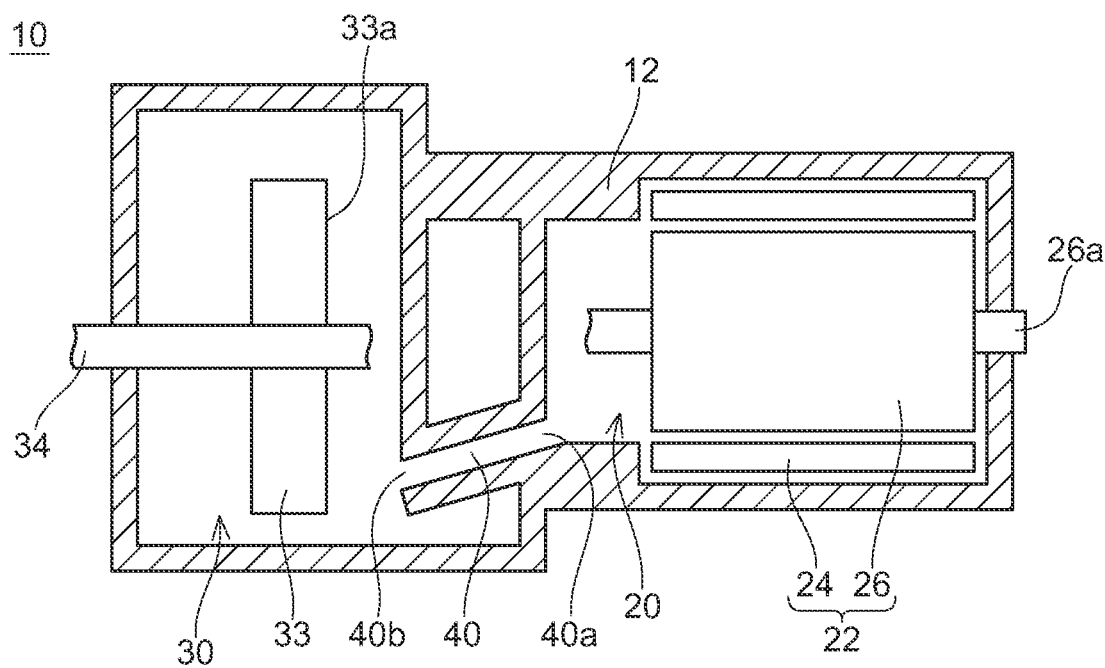
FIG. 3 is a longitudinal cross-sectional view of the drive unit along a line A-A in FIG. 1.

A drive unit 10 according to the embodiment shown in FIGS. 1 to 3 is mounted on a vehicle. The drive unit 10 rotates drive wheels of the vehicle. The drive unit 10 comprises a case 12. The case 12 includes an electric motor chamber 20 and a gear chamber 30 therein.

An electric motor 22 is housed in the electric motor chamber 20. The electric motor 22 comprises a stator 24 and a rotor 26. A shaft 26a of the rotor 26 is supported by a bearing provided at the case 12. The gear chamber 30 is offset relative to the electric motor chamber 20 in an axial direction of the shaft 26a. The shaft 26a of the rotor 26 extends from within the electric motor chamber 20 into the gear chamber 30. The rotor 26 can rotate relative to the case 12. The stator 24 is disposed around the rotor 26. The stator 24 is fixed to the case 12. When a current flows through the stator 24, the rotor 26 rotates.

Three gears 31, 32, 33 are housed in the gear chamber 30. In the drawings, depiction of gear teeth is omitted. The gear 31 is fixed to the shaft 26a of the rotor 26. The gear 31 has teeth on its outer circumferential surface. The gear 32 is a so-called counter gear. The gear 32 can rotate about an axis parallel to the shaft 26a. The gear 32 comprises a large-diameter portion 32a and a small-diameter portion 32b. The outer circumferential surface of the large-diameter portion 32a and the outer circumferential surface of the small-diameter portion 32b each have teeth. The gear 31 meshes with the large-diameter portion 32a of the gear 32. A shaft 34 is in the gear chamber 30. The shaft 34 is supported by a bearing provided at the case 12. The shaft 34 is parallel to the shaft 26a. The shaft 34 can rotate relative to the case 12. The shaft 34 extends from within the gear chamber 30 to the outside of the case 12. Although not shown, the shaft 34 is connected to a drive shaft of the vehicle outside the case 12. The gear 33 is fixed to the shaft 34. The gear 33 can rotate, along with the shaft 34, relative to the case 12. The gear 33 comprises two side surfaces and an outer circumferential surface. A side surface 33a is one of the two side surfaces of the gear 33 that is closer to the electric motor chamber 20. The outer circumferential surface of the gear 33 has teeth. The gear 33 meshes with the small-diameter portion 32b of the gear 32.

When the electric motor 22 is in operation, the rotor 26 rotates. As the rotor 26 rotates, the gear 31 rotates along with the shaft 26a of the rotor 26. The gear 31 rotates in the direction indicated by an arrow 100 in FIG. 2. As the gear 31 rotates, the gear 32, which meshes with the gear 31, rotates in the direction indicated by an arrow 102 in FIG. 2. As the gear 32 rotates, the gear 33, which meshes with the gear 32, rotates in the direction indicated by an arrow 103 in FIG. 2. In this way, the gear 33 rotates with the rotation of the rotor 26.

Lubricant is stored in the electric motor chamber 20 and the gear chamber 30. The lubricant allows for smooth rotation of the rotor 26 and the gears 31 to 33. However, if the amount of lubricant in the electric motor chamber 20 is large, the rotation of the rotor 26 can be hindered by the resistance of the lubricant, thereby increasing the drive loss of the electric motor 22. Therefore, the case 12 is provided with a through hole 40 configured to allow the lubricant to flow between the electric motor chamber 20 and the gear chamber 30. The through hole 40 connects the electric motor chamber 20 and the gear chamber 30. When the rotor 26 rotates, the lubricant flows from the electric motor chamber 20 to the gear chamber 30 through the through hole 40. As shown in FIGS. 2 and 3, an opening 40a of the through hole 40 on the electric motor chamber 20 side is located at a bottom portion of the electric motor chamber 20. An opening 40b of the through hole 40 on the gear chamber 30 side is open in a side surface of the gear chamber 30. The opening 40b of the through hole 40 is positioned to face the side surface 33a of the gear 33. Therefore, the lubricant is discharged from the opening 40b of the through hole 40 toward the side surface 33a of the gear 33. The through hole 40 is inclined downward from the opening 40a toward the opening 40b. As shown in FIG. 1, the through hole 40 extends outwardly in the radial direction of the rotor 26 from the opening 40a toward the opening 40b.

Figure 4:
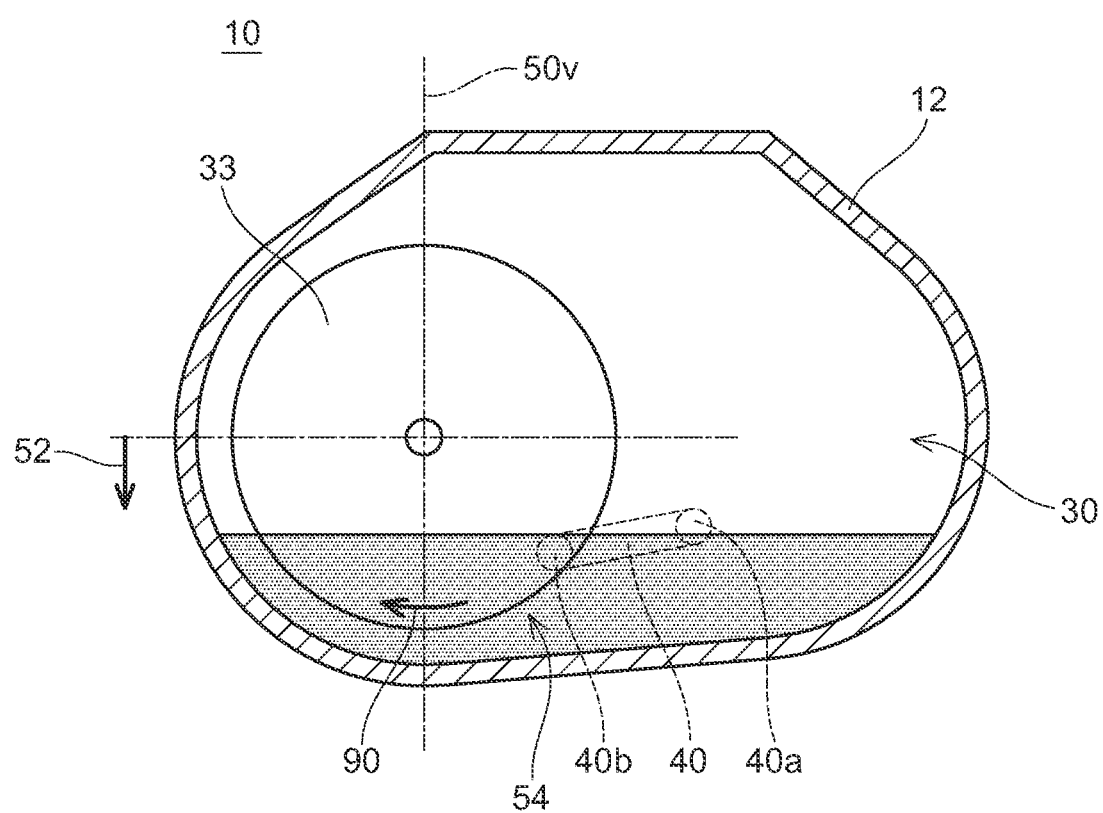
FIG. 4 shows the positional relationship between lubricant, a gear 33, and a through hole 40 when the rotor is stationary, in the same viewpoint as FIG. 2.

A lower region 52 shown in FIG. 4 indicates a region below the center of the gear 33. A vertical plane 50v shown in FIG. 4 is a vertical plane passing through the center axis of the gear 33 (i.e., a vertical plane including the center axis of the gear 33). An arrow 90 shown in FIG. 4 indicates the direction in which the gear 33 rotates when the rotor 26 rotates. In the lower region 52, the teeth of the gear 33 move from the right side to the left side of FIG. 4 when the gear 33 rotates. In other words, in the lower region 52, the right side of FIG. 4 is a rear side of the gear 33 in the rotation direction, and the left side of FIG. 4 is a front side of the gear 33 in the rotation direction. Hereinafter, a part of the lower region 52 rearward of the vertical plane 50v in the rotation direction of the gear 33 will be referred to as a lower rear region 54. As shown in FIG. 4, the opening 40b of the through hole 40 on the gear chamber 30 side is located in the lower rear region 54. In other words, the opening 40b faces the side surface 33a of the gear 33 in the lower rear region 54.

In FIG. 4, the dotted area represents the lubricant. FIG. 4 shows the state of the lubricant when the rotor 26 is stationary (i.e., when the gear 33 is stationary). As shown in FIG. 4, when the rotor 26 is stationary, a lower portion of the gear 33 is immersed in the lubricant. Also, when the rotor 26 is stationary, the opening 40b of the through hole 40 is immersed in the lubricant.

Figure 5:
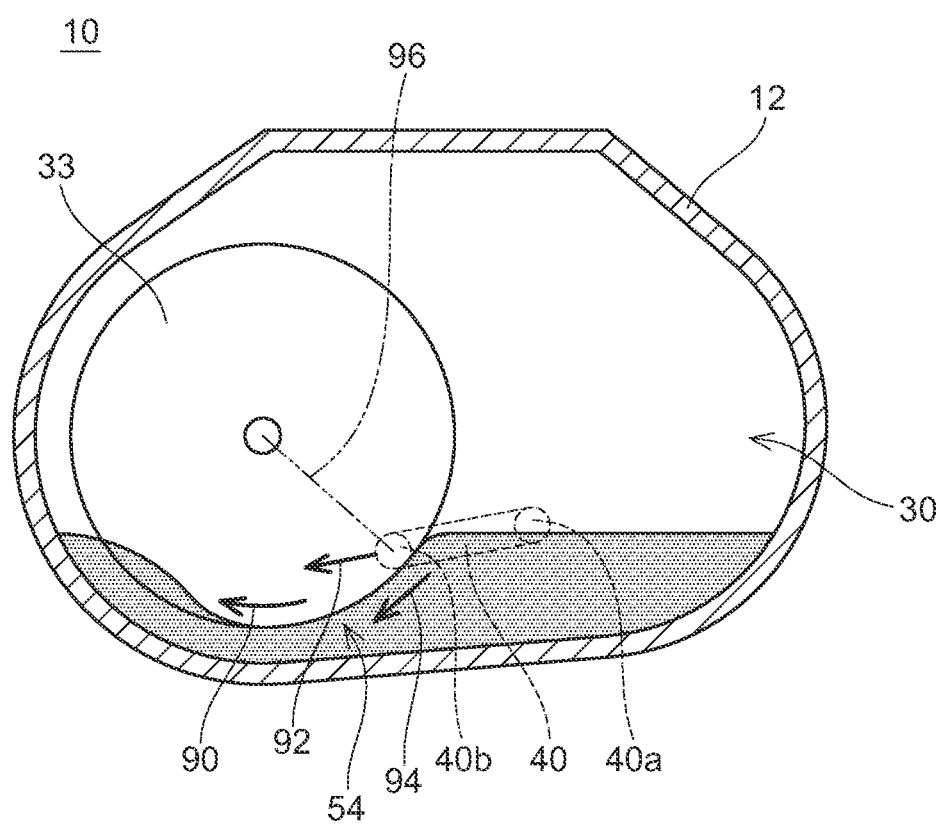
FIG. 5 shows the positional relationship between the lubricant, the gear 33, and the through hole 40 while the rotor is rotating, in the same viewpoint as FIG. 2.

When the rotor 26 rotates, a flow of the lubricant occurs in the electric motor chamber 20. Therefore, the lubricant flows from the electric motor chamber 20 to the gear chamber 30 through the through hole 40. As a result, the lubricant is discharged from the opening 40b of the through hole 40 toward the side surface 33a of the gear 33 as shown by an arrow 92 in FIG. 5. The through hole 40 causes the lubricant to be discharged therefrom such that the discharge direction 92 of the lubricant discharged from the opening 40b is along the rotation direction 90 of the gear 33. In other words, the lubricant is discharged from the opening 40b of the through hole 40 forward in the rotation direction 90 relative to a radial direction 96 of the gear 33. This helps make the flow of the lubricant at the opening 40b less turbulent, and thereby suppressing the lubricant from flowing back into the through hole 40 from the gear chamber 30. Further, as shown in FIG. 5, when the gear 33 rotates with the rotation of the rotor 26, the lubricant flows diagonally downward in the lower rear region 54 as shown by an arrow 94. This flow lowers the liquid level of the lubricant in the lower rear region 54 and causes the opening 40b of the through hole 40 to be exposed from the lubricant. In response to the lowering of the liquid level of the lubricant in the lower rearward region 54, discharge of the lubricant from the through hole 40 is facilitated. This also suppresses the lubricant from flowing back into the through hole 40 from the gear chamber 30. As mentioned above, the through hole 40 is inclined downward from the opening 40a toward the opening 40b. This inclination facilitates the flow of the lubricant within the through hole 40 from the electric motor chamber 20 to the gear chamber 30. This also suppresses the lubricant from flowing back into the through hole 40 from the gear chamber 30. Since the backflow of the lubricant within the through hole 40 is suppressed as described above, the lubricant flows smoothly from within the electric motor chamber 20 to the gear chamber 30 when the rotor 26 starts rotating. Therefore, the lubricant in the electric motor chamber 20 decreases in a short amount of time after the rotor 26 starts rotating, allowing the rotor 26 to rotate with low loss. Therefore, according to the configuration of this drive unit, the drive loss of the electric motor 22 can be reduced.

Figure 6:
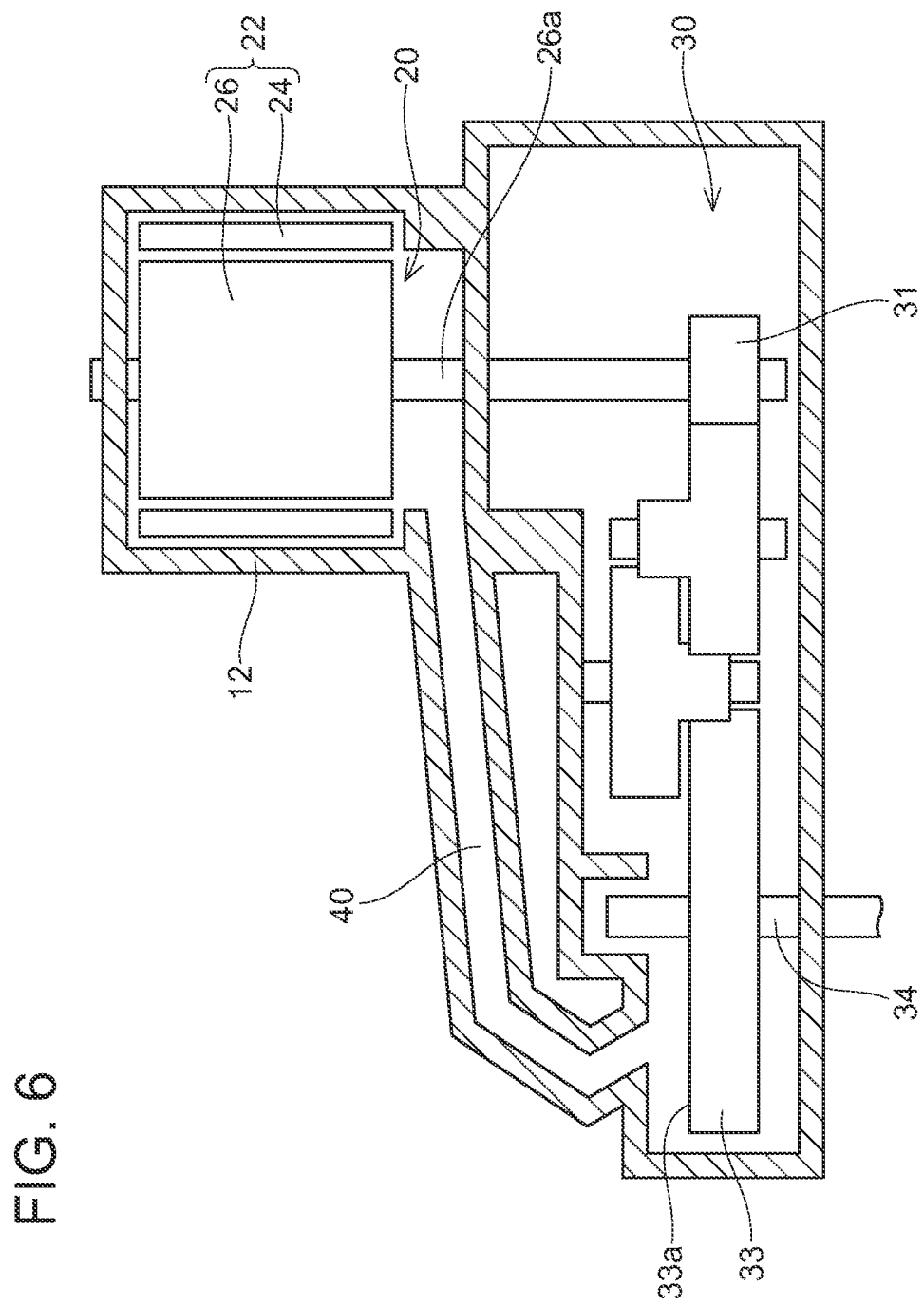
FIG. 6 shows an internal structure of a drive unit with two intermediate gears.

In the embodiment described above, the single gear 32 is provided as an intermediate gear that transmits power from the gear 31 to the gear 33. In other words, there is one intermediate gear provided between the gear 31 and the gear 33. In contrast, FIG. 6 shows a configuration in which two intermediate gears are provided in series between the gear 31 and the gear 33. In this case, the rotation direction of the gear 33 is opposite to that of FIGS. 1 to 5. Thus, the lower rear region of the gear 33 is farther from the rotor 26. Therefore, if the through hole 40 is provided to open in the lower rear region, the through hole 40 is required to be longer. Further, in order for the lubricant to be discharged along the rotation direction of the gear 33 in the lower rear region, the through hole 40 is required to be bent as shown in FIG. 6. Thus, with two intermediate gears, the through hole 40 will become longer and more complicated. This problem is associated with the number of intermediate gears being an even number. In contrast, the through hole 40 can have a short length and a simple shape (e.g., a straight shape) with the number of intermediate gears being an odd number. This allows for downsize of the drive unit.

The gear 31 of the embodiment is an example of first gear. The gear 32 of the embodiment is an example of intermediate gear. The gear 33 of the embodiment is an example of specific gear.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A drive unit, comprising:
    a case comprising an electric motor chamber and a gear chamber;
    an electric motor comprising a rotor housed in the electric motor chamber;
    a specific gear housed in the gear chamber and configured to rotate with rotation of the rotor;
    lubricant stored in the electric motor chamber and the gear chamber; and
    a through hole connecting the electric motor chamber and the gear chamber and configured to allow the lubricant to flow from the electric motor chamber to the gear chamber when the rotor rotates,
    wherein
    an opening of the through hole on a gear chamber side is positioned so as to face a side surface of the specific gear,
    a region below a center of the specific gear is defined as a lower region, a part of the lower region that is located rearward of a vertical plane passing through a center axis of the specific gear in a rotation direction of the specific gear is defined as a lower rear region, and the opening is in the lower rear region.

2. The drive unit of claim 1, wherein when the rotor rotates, the lubricant discharged from the opening is discharged forward in the rotation direction of the specific gear in the lower rear region.

3. The drive unit of claim 1, wherein
    a first gear fixed to a shaft of the rotor and a plurality of intermediate gears configured to transmit power from the first gear to the specific gear are housed in the gear chamber, and
    a number of the intermediate gears is an odd number.

4. The drive unit of claim 1, wherein the through hole is inclined downward from the electric motor chamber toward the gear chamber.

* * * * *